United States Patent
Yu et al.

(10) Patent No.: US 7,054,098 B1
(45) Date of Patent: May 30, 2006

(54) DISK DRIVE EMPLOYING ASYMMETRIC ACCELERATION/DECELERATION PULSES FOR ACOUSTIC NOISE REDUCTION DURING UNLATCH

(75) Inventors: Jie Yu, Irvine, CA (US); David D. Nguyen, Fountain Valley, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/860,339

(22) Filed: Jun. 1, 2004

(51) Int. Cl.
*G11B 5/596* (2006.01)
(52) U.S. Cl. ............................ 360/78.06; 360/78.04
(58) Field of Classification Search ............ 360/78.04, 360/78.06
See application file for complete search history.

(56) References Cited

U.S. PATENT DOCUMENTS

| | | | |
|---|---|---|---|
| 4,864,437 A | 9/1989 | Couse et al. | |
| 5,568,333 A | 10/1996 | Bang | |
| 5,600,219 A | 2/1997 | Gomez | |
| 5,844,743 A | 12/1998 | Funches | |
| 6,028,744 A | 2/2000 | Amirkiai et al. | |
| 6,081,112 A | 6/2000 | Carobolante et al. | |
| 6,097,564 A | 8/2000 | Hunter | |
| 6,140,791 A * | 10/2000 | Zhang | 318/632 |
| 6,212,027 B1 | 4/2001 | Lee et al. | |
| 6,222,696 B1 | 4/2001 | Kim | |
| 6,396,652 B1 | 5/2002 | Kawachi et al. | |
| 6,441,987 B1 | 8/2002 | Lee | |
| 6,441,988 B1 | 8/2002 | Kang et al. | |
| 6,445,531 B1 * | 9/2002 | Gaertner et al. | 360/78.06 |
| 6,535,358 B1 | 3/2003 | Hauert et al. | |
| 6,597,529 B1 | 7/2003 | DeRosa | |
| 6,624,964 B1 * | 9/2003 | Pirzadeh | 360/78.07 |
| 6,791,785 B1 * | 9/2004 | Messenger et al. | 360/78.04 |

* cited by examiner

*Primary Examiner*—Wayne Young
*Assistant Examiner*—Jason Olson
(74) *Attorney, Agent, or Firm*—Howard H. Sheering, Esq.; Jonathan E. Prejean, Esq.

(57) ABSTRACT

A disk drive is disclosed comprising a disk, an actuator arm, a head connected to a distal end of the actuator arm, and a voice coil motor (VCM) for rotating the actuator arm about a pivot to actuate the head over the disk, wherein the VCM rotates the actuator arm into a latched positioned when the disk drive is idle. Disk drive control circuitry unlatches the actuator arm by applying a driving current to the VCM according to an open-loop current profile. The open-loop current profile comprises an acceleration pulse having an acceleration magnitude and an acceleration interval, and a deceleration pulse having a deceleration magnitude and a deceleration interval. The deceleration magnitude is substantially smaller than the acceleration magnitude, and the deceleration interval is substantially longer than the acceleration interval, to thereby attenuate acoustic noise when unlatching the actuator arm.

16 Claims, 3 Drawing Sheets

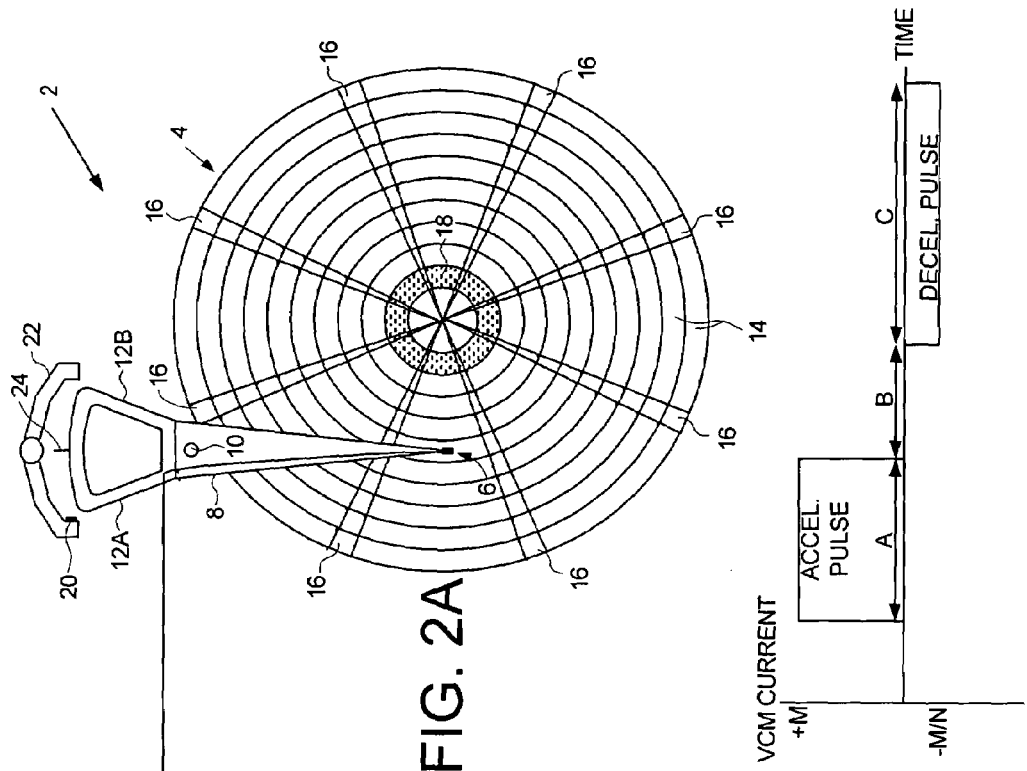
FIG. 2A
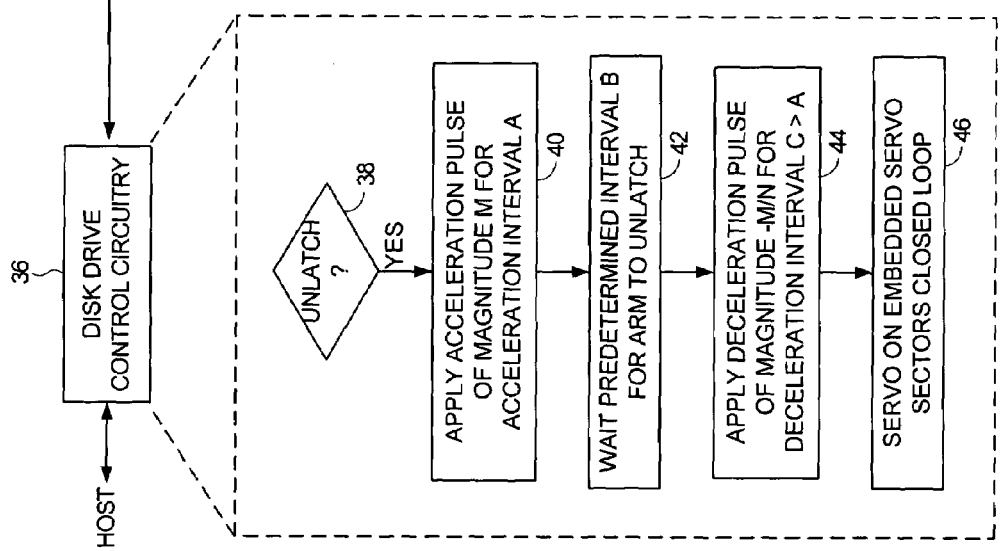
FIG. 2B
FIG. 2C

DISK DRIVE EMPLOYING ASYMMETRIC ACCELERATION/DECELERATION PULSES FOR ACOUSTIC NOISE REDUCTION DURING UNLATCH

BACKGROUND OF THE INVENTION

1. Field of the Invention

The present invention relates to disk drives. More particularly, the present invention relates to a disk drive employing asymmetric acceleration/deceleration pulses for acoustic noise reduction during unlatch.

2. Description of the Prior Art

FIG. 1A shows a prior art disk drive 2 comprising a disk 4 and a head 6 actuated over the disk 4 by a voice coil motor (VCM). The head 6 is connected to the distal end of an actuator arm 8 which is rotated about a pivot 10 in order to actuate the head 6 radially over the disk 4. The VCM comprises a voice coil attached to the actuator arm 8 having a first leg 12A and a second leg 12B for conducting current in a clockwise or counterclockwise direction thereby generating a magnetic flux which interacts with the magnetic field of permanent magnets (not shown) to generate a torque to rotate the actuator arm 8 about the pivot 10 in a clockwise or counterclockwise direction. The disk 4 comprises a plurality of tracks 14 defined by a plurality of embedded servo sectors 16, wherein disk drive control circuitry 17 processes the embedded servo sectors 16 in a closed-loop servo system to seek the head 6 to a target track and maintain the head 6 over the target track during read/write operations.

When the disk drive is powered down (or otherwise idle), the disk drive control circuitry 17 will perform a park operation wherein the head 6 is parked and the actuator arm 8 is latched. In the embodiment of FIG. 1A, the head 6 is parked on a landing zone 18 by rotating the actuator arm 8 in the counterclockwise direction. While the head 6 is parked, the actuator arm 8 is "latched" to prevent it from rotating the head 6 away from the landing zone 18. In the embodiment of FIG. 1A, a magnet 20 attached to a crash stop 22 attracts and holds a metal tang 24 attached to the actuator arm 8.

FIG. 1B shows a flow diagram of the steps executed by the disk drive control circuitry 17 to unlatch the actuator arm 8 when the disk drive is powered up (or otherwise comes out of an idle state). The actuator arm 8 is typically unlatched by driving the VCM with an open loop current since position (or velocity) information is unavailable. FIG. 1C shows a waveform illustrating the open loop current applied to the VCM to unlatch the actuator arm 8. Referring to FIG. 1B, when an unlatch operation is initiated at step 26, an acceleration pulse is applied to the VCM at step 28 to unlatch the tang 24 from the magnet 20. The acceleration pulse comprises an acceleration magnitude +M applied to the VCM and an acceleration interval A (FIG. 1C). At step 30 there is a predetermined delay for an interval B to allow the tang 24 to "escape" the latching force of the magnet 20. At step 32 a deceleration pulse is applied to the VCM to decelerate the actuator arm 8 to enable at step 34 closed loop position control of the actuator arm 8 by reading the embedded servo sectors 16. The deceleration pulse comprises a deceleration magnitude −M applied to the VCM and a deceleration interval C (FIG. 1C). The deceleration interval C is less than the acceleration interval A due to the force needed to escape the latching force of the magnet 20. The deceleration magnitude −M is equal (or nearly equal) the acceleration magnitude +M resulting in a "bang-bang" open-loop current profile.

Using a "bang-bang" open-loop current profile for unlatching the actuator arm can generate undesirable acoustic noise for certain applications, such as digital video recorders. There is, therefore, a need to attenuate the acoustic noise when unlatching the actuator arm in a disk drive using an open-loop current profile.

SUMMARY OF THE INVENTION

The present invention may be regarded as a disk drive comprising a disk, an actuator arm, a head connected to a distal end of the actuator arm, and a voice coil motor (VCM) for rotating the actuator arm about a pivot to actuate the head over the disk, wherein the VCM rotates the actuator arm into a latched positioned when the disk drive is idle. Disk drive control circuitry unlatches the actuator arm by applying a driving current to the VCM according to an open-loop current profile. The open-loop current profile comprises an acceleration pulse having an acceleration magnitude and an acceleration interval, and a deceleration pulse having a deceleration magnitude and a deceleration interval. The deceleration magnitude is substantially smaller than the acceleration magnitude, and the deceleration interval is substantially longer than the acceleration interval, to thereby attenuate acoustic noise when unlatching the actuator arm.

In one embodiment, the open-loop current profile comprises a substantially zero magnitude for a predetermined interval between the acceleration and deceleration intervals.

In another embodiment, the acceleration pulse comprises a steep on-ramp followed by a substantially constant amplitude followed by a gradual off-ramp. In one embodiment, the gradual off-ramp of the acceleration pulse comprises an arc-shape, and in another embodiment the gradual off-ramp comprises an S-shape.

In yet another embodiment, the deceleration pulse comprises a gradual on-ramp followed by a substantially constant amplitude followed by a gradual off-ramp. In one embodiment, the gradual on-ramp and gradual off-ramp comprise an arc shape, and in another embodiment, the gradual on-ramp and gradual off-ramp comprise an S-shape.

The present invention may also be regarded as a method of unlatching an actuator arm in a disk drive, the disk drive comprising a disk, a head connected to a distal end of the actuator arm, and a voice coil motor (VCM) for rotating the actuator arm about a pivot to actuate the head over the disk. The method of unlatching the actuator arm comprises the step of applying a driving current to the VCM according to an open-loop current profile. The open-loop current profile comprises an acceleration pulse having an acceleration magnitude and an acceleration interval, and a deceleration pulse having a deceleration magnitude and a deceleration interval. The deceleration magnitude is substantially smaller than the acceleration magnitude, and the deceleration interval is substantially longer than the acceleration interval, to thereby attenuate acoustic noise when unlatching the actuator arm.

BRIEF DESCRIPTION OF THE DRAWINGS

FIG. 2A shows a disk drive according to an embodiment of the present invention comprising a disk and a head connected to a distal end of actuator arm which is latched to a crash stop when the disk drive is idle.

FIG. 2B is a flow diagram according to an embodiment of the present invention for unlatching the actuator arm by applying a driving current to a VCM according to an asymmetric open-loop current profile wherein the deceleration pulse is smaller in amplitude and longer in duration than the acceleration pulse.

FIG. 2C shows an open-loop current profile according to an embodiment of the present invention comprising an acceleration pulse, and a deceleration pulse having a substantially smaller magnitude and for a substantially longer duration than the acceleration pulse.

DESCRIPTION OF THE PREFERRED EMBODIMENTS

Figure 1A:
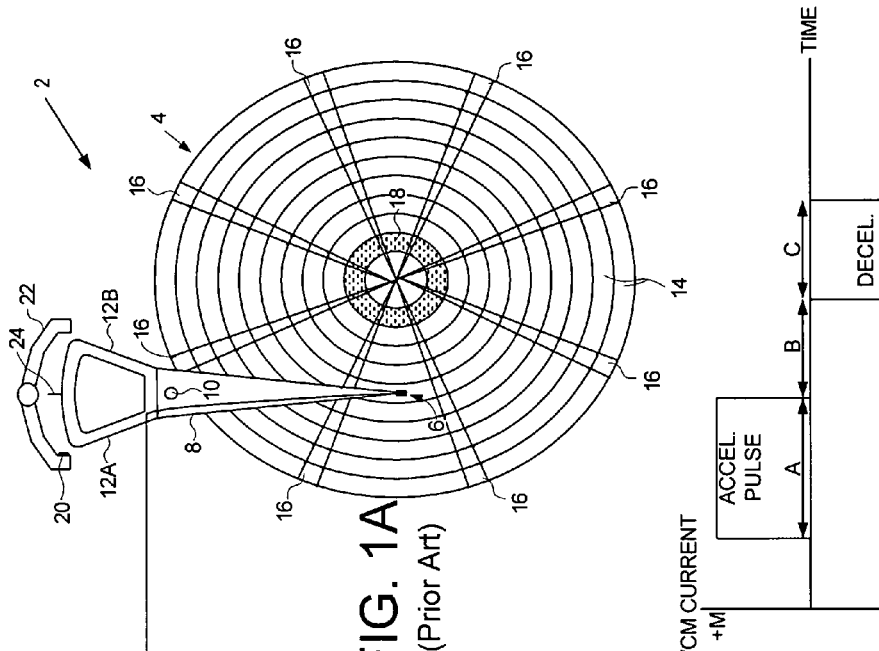
FIG. 1A shows a prior art disk drive comprising a disk and a head connected to a distal end of actuator arm which is latched to a crash stop when the disk drive is idle.
Figure 1B:
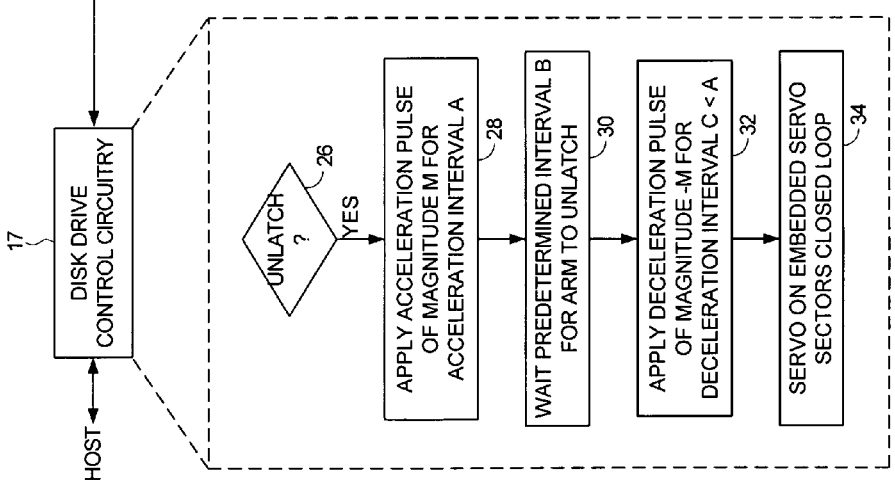
FIG. 1B is a flow diagram showing a prior art method for unlatching the actuator arm by applying a driving current to a VCM according to a substantially symmetric "bang-bang" open-loop current profile.

FIG. 2A shows a disk drive 2 according to an embodiment of the present invention comprising a disk 4, an actuator arm 8, a head 6 connected to a distal end of the actuator arm 8, and a voice coil motor (VCM) (comprising a voice coil with sides 12A and 12B) for rotating the actuator arm 8 about a pivot 10 to actuate the head 6 over the disk 4, wherein the VCM rotates the actuator arm 8 into a latched positioned when the disk drive 2 is idle. Disk drive control circuitry 36 unlatches the actuator arm 8 by applying a driving current to the VCM according to an open-loop current profile. FIG. 2C shows an open-loop current profile according to an embodiment of the present invention comprising an acceleration pulse having an acceleration magnitude and an acceleration interval, and a deceleration pulse having a deceleration magnitude and a deceleration interval. The deceleration magnitude is substantially smaller than the acceleration magnitude, and the deceleration interval is substantially longer than the acceleration interval, to thereby attenuate acoustic noise when unlatching the actuator arm.

In the embodiment of FIG. 2A, a magnet 20 is attached to a crash stop 22, and the actuator arm 8 comprises a tang 24 which engages the magnet 20 in order to latch the actuator arm 8. FIG. 2B shows a flow diagram executed by the disk drive control circuitry 36 wherein if at step 38 the disk drive 2 exits the idle mode the actuator arm 8 is unlatched at step 40 by applying an acceleration pulse to the VCM comprising an acceleration magnitude M for an acceleration interval A (FIG. 2C). At step 42 the driving current is turned off for a predetermined interval B to allow the actuator arm 8 to unlatch. At step 44 a deceleration pulse is applied to the VCM comprising a deceleration magnitude of −M/N for a deceleration interval C>A. Once the actuator arm 8 decelerates to a predetermined velocity, at step 46 the disk drive control circuitry 36 servos the VCM in response to embedded servo sectors 16 recorded on the disk 4 in a closed-loop system.

Figure 1C:
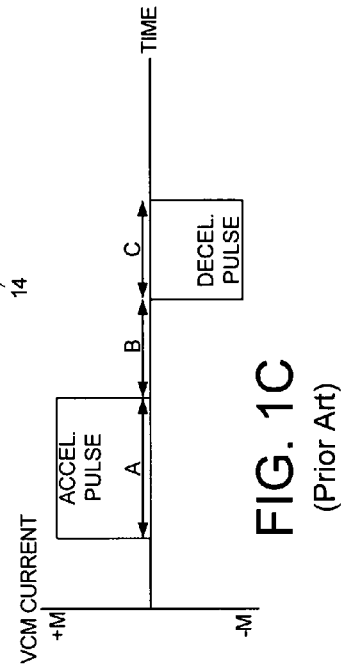
FIG. 1C shows the prior art open-loop current profile as comprising an acceleration pulse, and a deceleration pulse of substantially the same magnitude but having a shorter interval than the acceleration pulse.

Reducing the magnitude of the deceleration pulse as shown in FIG. 2C reduces the acoustic noise when unlatching the actuator arm 8 as compared to the prior art "bang-bang" open-loop current profile of FIG. 1C. Extending the duration of the deceleration pulse (C>A) achieves the desired integral of the deceleration current similar to the deceleration pulse of FIG. 1C.

In one embodiment, acceleration/deceleration pulses comprising nominal magnitudes and durations are determined and used for a family of disk drives. The magnitude and duration of the acceleration pulse is selected to account for variations in electrical/mechanical parameters to ensure reliable unlatch in all cases. Similarly, the magnitude and duration of the deceleration pulse is selected to account for unknown torque disturbances. In another embodiment, the magnitude and duration of the acceleration/deceleration pulses are calibrated for each individual disk drive. That is, the magnitude and duration of the acceleration/deceleration pulses are adjusted within each disk drive during a calibration procedure until acceptable unlatch performance is achieved.

Figure 3A:
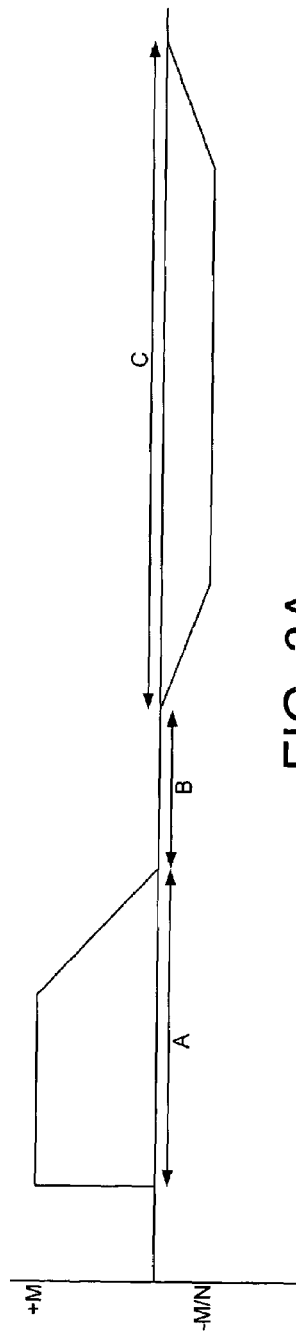
FIG. 3A shows an embodiment of the present invention wherein the open-loop current profile comprises acceleration and deceleration pulses having gradual ramps.
Figure 3B:
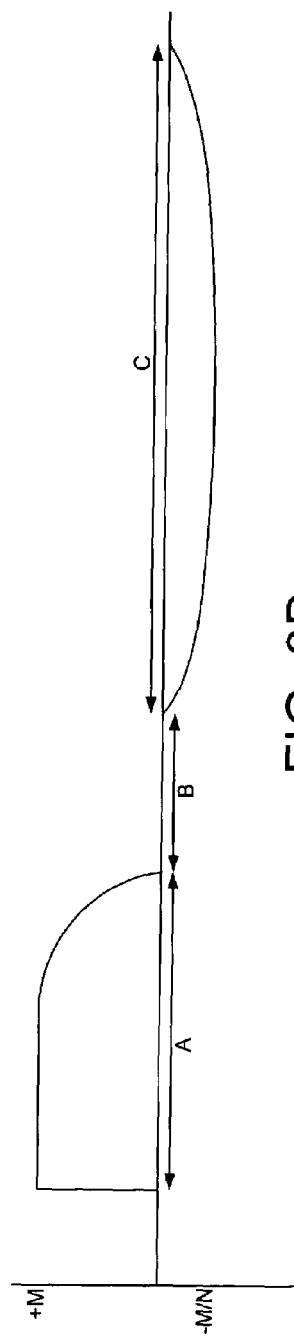
FIG. 3B shows an embodiment of the present invention wherein the open-loop current profile comprises acceleration and deceleration pulses having arc shapes.
Figure 3C:
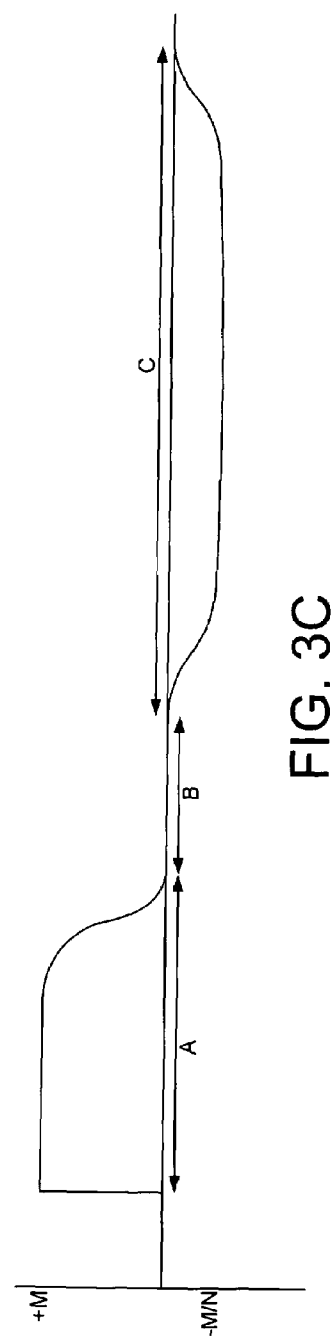
FIG. 3C shows an embodiment of the present invention wherein the open-loop current profile comprises acceleration and deceleration pulses having S-shapes.

FIG. 3A illustrates an embodiment of the present invention wherein the acceleration pulse comprises a steep on-ramp followed by a substantially constant amplitude followed by a gradual off-ramp. The steep on-ramp is needed to "escape" the latching force of the magnet 20 and the gradual off-ramp helps reduce acoustic noise. The deceleration pulse comprises a gradual on-ramp and a gradual off-ramp which also reduces acoustic noise as compared to the prior art bang-bang current profile of FIG. 1C. Further reduction in acoustic noise may be achieved if the ramps in the acceleration/deceleration pulses comprise an arc-shape as shown in the embodiment of FIG. 3B. Still further reduction in acoustic noise may be achieved if the ramps in the acceleration/deceleration pulses comprise an S-shape as shown in the embodiment of FIG. 3C. The arc-shape and S-shape ramps help "smooth out" the sharp edges of the current profile (attenuate the high harmonics of the prior art square wave current profile) resulting in quieter operation during acceleration/deceleration. In one embodiment, the disk drive control circuitry 36 implements any suitable equation (e.g., any suitable polynomial) to generate the smooth open-loop current profiles of FIG. 3B or 3C.

We claim:
1. A disk drive comprising:
    (a) a disk;
    (b) an actuator arm;
    (c) a head connected to a distal end of the actuator arm;
    (d) a voice coil motor (VCM) for rotating the actuator arm about a pivot to actuate the head over the disk, wherein the VCM rotates the actuator arm into a latched positioned when the disk drive is idle; and
    (e) disk drive control circuitry for unlatching the actuator arm by applying a driving current to the VCM according to an open-loop current profile, the open-loop current profile comprising:
        an acceleration pulse having an acceleration magnitude and an acceleration interval; and
        a deceleration pulse having a deceleration magnitude and a deceleration interval, wherein the deceleration magnitude is substantially smaller than the acceleration magnitude, and the deceleration interval is sub- stantially longer than the acceleration interval, to thereby attenuate acoustic noise when unlatching the actuator arm.

2. The disk drive as recited in claim 1, wherein the open-loop current profile comprises a substantially zero magnitude for a predetermined interval between the acceleration and deceleration intervals.

3. The disk drive as recited in claim 1, wherein the acceleration pulse comprises a steep on-ramp followed by a substantially constant amplitude followed by a gradual off-ramp.

4. The disk drive as recited in claim 1, wherein the deceleration pulse comprises a gradual on-ramp followed by a substantially constant amplitude followed by a gradual off-ramp.

5. The disk drive as recited in claim 3, wherein the gradual off-ramp of the acceleration pulse comprises an arc-shape.

6. The disk drive as recited in claim 3, wherein the gradual off-ramp of the acceleration pulse comprises an S-shape.

7. The disk drive as recited in claim 4, wherein the gradual on-ramp and gradual off-ramp of the deceleration pulse comprise an arc shape.

8. The disk drive as recited in claim 4, wherein the gradual on-ramp and gradual off-ramp of the deceleration pulse comprise an S-shape.

9. A method of unlatching an actuator arm in a disk drive, the disk drive comprising a disk, a head connected to a distal end of the actuator arm, and a voice coil motor (VCM) for rotating the actuator arm about a pivot to actuate the head over the disk, the method of unlatching the actuator arm comprises the step of applying a driving current to the VCM according to an open-loop current profile, the open-loop current profile comprising:

(a) an acceleration pulse having an acceleration magnitude and an acceleration interval; and (b) a deceleration pulse having a deceleration magnitude and a deceleration interval, wherein the deceleration magnitude is substantially smaller than the acceleration magnitude, and the deceleration interval is substantially longer than the acceleration interval, to thereby attenuate acoustic noise when unlatching the actuator arm.

10. The method of unlatching an actuator arm as recited in claim 9, wherein the open-loop current profile comprises a substantially zero magnitude for a predetermined interval between the acceleration and deceleration intervals.

11. The method of unlatching an actuator arm as recited in claim 9, wherein the acceleration pulse comprises a steep on-ramp followed by a substantially constant amplitude followed by a gradual off-ramp.

12. The method of unlatching an actuator arm as recited in claim 9, wherein the deceleration pulse comprises a gradual on-ramp followed by a substantially constant amplitude followed by a gradual off-ramp.

13. The method of unlatching an actuator arm as recited in claim 11, wherein the gradual off-ramp of the acceleration pulse comprises an arc-shape.

14. The method of unlatching an actuator arm as recited in claim 11, wherein the gradual off-ramp of the acceleration pulse comprises an S-shape.

15. The method of unlatching an actuator arm as recited in claim 12, wherein the gradual on-ramp and gradual off-ramp of the deceleration pulse comprise an arc shape.

16. The method of unlatching an actuator arm as recited in claim 12, wherein the gradual on-ramp and gradual off-ramp of the deceleration pulse comprise an S-shape.

* * * * *